United States Patent
Sato

(10) Patent No.: US 11,196,884 B2
(45) Date of Patent: Dec. 7, 2021

(54) IMAGE FORMING APPARATUS

(71) Applicant: CANON KABUSHIKI KAISHA, Tokyo (JP)

(72) Inventor: Kengo Sato, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/637,005

(22) Filed: Jun. 29, 2017

(65) Prior Publication Data

US 2018/0013906 A1   Jan. 11, 2018

(30) Foreign Application Priority Data

Jul. 7, 2016 (JP) .............................. JP2016-134647

(51) Int. Cl.
| | |
|---|---|
| *B41J 29/38* | (2006.01) |
| *G03G 15/00* | (2006.01) |
| *H04N 1/00* | (2006.01) |
| *G03G 15/20* | (2006.01) |
| *G03G 15/23* | (2006.01) |

(52) U.S. Cl.
CPC ..... *H04N 1/00657* (2013.01); *G03G 15/2053* (2013.01); *G03G 15/234* (2013.01); *H04N 1/0066* (2013.01); *H04N 1/00602* (2013.01); *B41J 29/38* (2013.01); *B65H 2301/3331* (2013.01); *G03G 15/50* (2013.01);
(Continued)

(58) Field of Classification Search
CPC ................. H04N 1/00657; G03G 2215/00945
See application file for complete search history.

(56) References Cited

U.S. PATENT DOCUMENTS

| | | | |
|---|---|---|---|
| 5,172,138 A | 12/1992 | Okazawa et al. | |
| 5,303,015 A | 4/1994 | Sato | |
| | (Continued) | | |

FOREIGN PATENT DOCUMENTS

| | | | | |
|---|---|---|---|---|
| JP | 08227185 A | * | 9/1996 | ........... H04N 1/0058 |
| JP | 2003-182907 A | | 7/2003 | |
| | (Continued) | | | |

OTHER PUBLICATIONS

Copending, unpublished U.S. Appl. No. 15/635,603 to Kengo Sato, filed Jun. 28, 2017.
(Continued)

*Primary Examiner* — Jill E Culler
*Assistant Examiner* — Ruben C Parco, Jr.
(74) *Attorney, Agent, or Firm* — Venable LLP

(57) ABSTRACT

Provided is an image forming apparatus, in which a recording material is conveyed by a reverse portion rotated in a first direction at a first velocity which is faster than a conveyance velocity of the recording material in a fixing portion after a rear end portion of the recording material passes through the fixing portion, and then, the recording material is conveyed to a conveying portion by the reverse portion rotated in a second direction opposite to the first direction through a conveyance path at a second velocity which is faster than the conveyance velocity of the recording material in the fixing portion, and a conveyance velocity of the recording material is set to a third velocity which is slower than the second velocity at a predetermined timing before the rear end portion of the recording material reaches a curved portion of the conveyance path.

13 Claims, 11 Drawing Sheets

(52) U.S. Cl.
CPC ............. *G03G 2215/00945* (2013.01); *G03G 2215/2045* (2013.01); *H04N 1/00631* (2013.01)

(56) References Cited

U.S. PATENT DOCUMENTS

| | | | |
|---|---|---|---|
| 5,481,336 A | 1/1996 | Tachibana et al. | |
| 5,713,060 A | 1/1998 | Sato et al. | |
| 5,875,373 A | 2/1999 | Sato et al. | |
| 6,487,379 B2 | 11/2002 | Sato | |
| 6,669,189 B2* | 12/2003 | Seto | G03G 15/234 271/186 |
| 6,785,478 B2 | 8/2004 | Takahashi et al. | |
| 7,551,887 B2 | 6/2009 | Ohtsuki | |
| 8,768,238 B2 | 7/2014 | Kimura et al. | |
| 9,442,450 B2 | 9/2016 | Sato et al. | |
| 9,632,471 B2 | 4/2017 | Sato et al. | |
| 2006/0062615 A1* | 3/2006 | Horio | G03G 15/607 399/374 |
| 2006/0239734 A1 | 10/2006 | Ohtsuki | |
| 2006/0269339 A1* | 11/2006 | Okamoto | G03G 15/6564 399/401 |
| 2009/0230613 A1* | 9/2009 | Kuno | B65H 31/38 271/176 |
| 2010/0239296 A1* | 9/2010 | Kimura | G03G 15/234 399/68 |
| 2013/0038017 A1* | 2/2013 | Matsui | G03G 15/6573 271/270 |
| 2017/0334673 A1* | 11/2017 | Dchalk | B41J 13/0036 |

FOREIGN PATENT DOCUMENTS

| | | |
|---|---|---|
| JP | 2003-276897 A | 10/2003 |
| JP | 2004-331278 A | 11/2004 |
| JP | 2006-182475 A | 7/2006 |
| JP | 2006-298599 A | 11/2006 |
| JP | 2010-223983 A | 10/2010 |

OTHER PUBLICATIONS

Jun. 9, 2020 Japanese Official Action in Japanese Patent Appln. No. 2016-134647.

Kengo Sato, U.S. Appl. No. 15/635,603, filed Jun. 28, 2017.

Office Action in Japanese Patent Application No. 2016-134647, dated Dec. 15, 2020.

* cited by examiner

IMAGE FORMING APPARATUS

BACKGROUND OF THE INVENTION

Field of the Invention

The present invention relates to an image forming apparatus such as a copying machine, a printer, and a facsimile machine.

Description of the Related Art

In an image forming apparatus such as a copying machine, a printer, and a facsimile machine, recently, productivity has been greatly improved, a conveyance velocity of a recording material has been accelerated, and the interval of the recording material at the time of performing continuous printing has shortened.

On the other hand, in a case where front and rear surfaces of the recording material after an image is formed are reversed, and the recording material is continuously discharged to the outside of a main body of the image forming apparatus, time for reversing the direction of the recording material is required. In order to reverse the direction of the recording material, a switch-back system is general in which the recording material is conveyed to an arbitrary position, and then, is suspended once, and after that, the recording material is conveyed in an inversion direction. That is, time for switching back the recording material is required.

However, the productivity is required to be improved, and thus, the interval of the recording material further shortens. Therefore, in order to ensure the time for reversing the recording material, in Japanese Patent Laid-Open No. 2006-182475, the conveyance velocity of the recording material is accelerated after the image formation is ended, and the recording material is discharged to the outside of the main body of the image forming apparatus in a state where the recording material is accelerated after being switched back. Accordingly, high productivity can be maintained regardless of a discharge mode.

However, in a case where the recording material is conveyed by being accelerated after the image is formed, a frictional noise between the recording material and a conveyance guide increases, and an operation sound of the image forming apparatus deteriorates. In particular, in the acceleration of the recording material in the vicinity of a discharge portion, there are many cases where a conveying portion of the recording material is close from an exterior surface of the main body of the image forming apparatus, and thus, an influence on the operation sound particularly increases.

Recently, high comfortability has tended to be required along with the productivity, at home or in an office environment where the image forming apparatus is disposed, and thus, a reduction in the operation sound is strongly required in addition to high productivity.

It is desirable to provide an image forming apparatus which an operation sound can be reduced in addition to high productivity.

SUMMARY OF THE INVENTION

In order to solve the above issue, an image forming apparatus comprises: a fixing portion which fixes a toner image onto a recording material; a reverse portion which conveys the recording material onto which the toner image is fixed by the fixing portion, wherein the reverse portion rotates in a first direction, and then, in a second direction opposite to the first direction thereby the reverse portion reverses a traveling direction of the recording material; a conveying portion which conveys the recording material of which the traveling direction is reversed by the reverse portion; and a conveyance path through which the recording material from the reverse portion to the conveying unit passes and which includes a curved portion, wherein the recording material is conveyed by the reverse portion rotated in the first direction at a first velocity which is faster than a conveyance velocity of the recording material in the fixing portion after a rear end portion of the recording material in the traveling direction passes through the fixing portion, and then, the recording material is conveyed to the conveying portion by the reverse portion rotated in the second direction through the conveyance path at a second velocity which is faster than the conveyance velocity of the recording material in the fixing portion, and a conveyance velocity of the recording material in the conveying portion is set to a third velocity which is slower than the second velocity at a predetermined timing before the rear end portion of the recording material in the traveling direction reaches the curved portion of the conveyance path.

Further features of the present invention will become apparent from the following description of exemplary embodiments with reference to the attached drawings.

DESCRIPTION OF THE EMBODIMENTS

An embodiment of an image forming apparatus according to the invention will be described in detail by using the drawings.

<Image Forming Apparatus>

Figure 1:
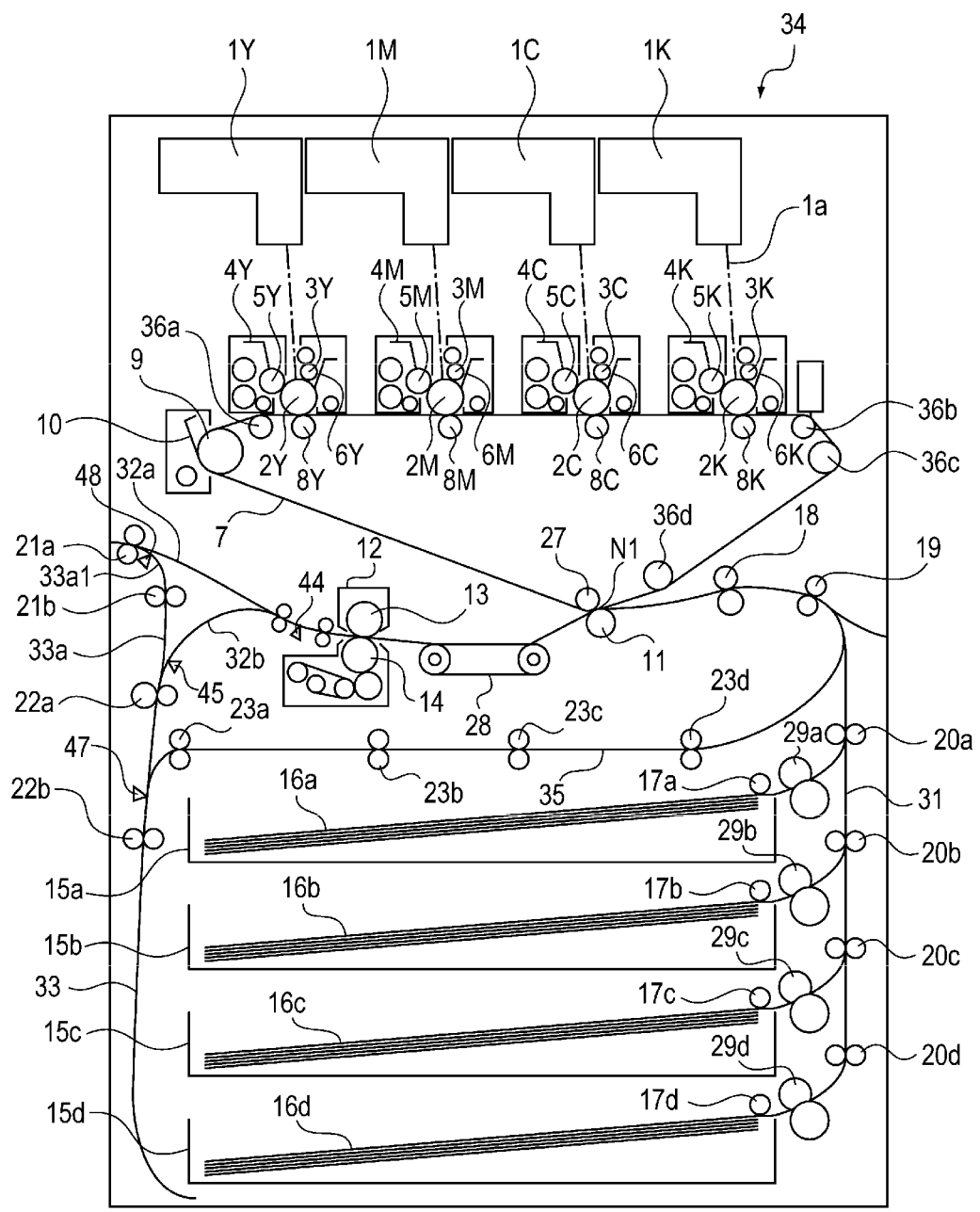
FIG. 1 is a sectional explanatory diagram illustrating a configuration of an image forming apparatus according to the invention.

First, a configuration of an image forming apparatus according to the invention will be described by using FIG. 1. FIG. 1 is a sectional explanatory diagram illustrating the configuration of the image forming apparatus according to the invention. An image forming apparatus 34 illustrated in FIG. 1 is an example of a color image forming apparatus. In FIG. 1, laser scanners 1Y, 1M, 1C, and 1K, which become an image exposing portion, are provided. In addition, photoconductive drums 2Y, 2M, 2C, and 2K, which become an image bearing member, are provided. Furthermore, for the sake of the convenience of the description, there is a case where the photoconductive drum 2 is described as a representative of the photoconductive drums 2Y, 2M, 2C, and 2K. The same applies to other image forming process portions.

Charging rollers 3Y, 3M, 3C, and 3K, which become a charging portion evenly charging a front surface of the photoconductive drum 2, are provided. Developing devices 4Y, 4M, 4C, and 4K, which become a developing portion, are provided. Developing sleeves 5Y, 5M, 5C, and 5K, which become a developer bearing member, are rotatably provided in the developing device 4. The developing sleeve 5 conveys a developer (a toner) of each color onto the front surface of each photoconductive drum 2. Cleaners 6Y, 6M, 6C, and 6K, which become a cleaning portion cleaning the front surface of the photoconductive drum 2, are provided. An intermediate transfer belt 7 is provided. The intermediate transfer belt 7 is rotatably stretched in a clockwise direction of FIG. 1 by a driving roller 9, tension rollers 36a to 36d, and an inner transfer roller 27.

Primary transfer rollers 8Y, 8M, 8C, and 8K, which become a primary transfer portion, are provided on an inner circumferential surface side of the intermediate transfer belt 7 to face the front surface of each of the photoconductive drums 2. A cleaner 10, which becomes a cleaning portion cleaning an outer circumferential surface of the intermediate transfer belt 7, is provided. A secondary transfer roller 11, which becomes a secondary transfer portion, is provided on the outer circumferential surface side of the intermediate transfer belt 7 to face the inner transfer roller 27. A fixing device 12, which becomes a fixing portion heat-fixing a toner image formed on the recording material 16, is provided. A fixing roller 13 is rotatably provided in the fixing device 12. A pressure roller 14 is rotatably provided in the fixing device 12 to face the fixing roller 13.

Sheet cassettes 15a to 15d are provided in a main body of the image forming apparatus 34 to be detachably attachable. Furthermore, there is a case where the sheet cassette 15 is described as a representative of the sheet cassettes 15a to 15d. Furthermore, there is a case where an option sheet cassette (not illustrated) is provided on the outside of the main body of the image forming apparatus 34.

Recording materials 16a to 16d are provided. Furthermore, there is a case where the recording material 16 is described as a representative of the recording materials 16a to 16d. Sheet rollers 17a to 17d are provided. Furthermore, there is a case where the sheet roller 17 is described as a representative of the sheet rollers 17a to 17d. A registration roller 18 is provided. A pre-registration roller 19 is provided. Intermediate conveying rollers 20a to 20d are provided. Furthermore, there is a case where the intermediate conveying roller 20 is described as a representative of the intermediate conveying rollers 20a to 20d.

An outside discharge roller 21a is provided. An outside pre-discharge roller 21b is provided. The outside discharge roller 21a and the outside pre-discharge roller 21b are configured as a conveying portion where the recording material 16 of which a traveling direction is reversed is conveyed by upper and lower reverse rollers 22a and 22b (a reverse portion). The outside discharge roller 21a and the outside pre-discharge roller 21b, which become the conveying portion, are a pair of discharge rollers discharging the recording material 16 to the outside of the image forming apparatus. The upper and lower reverse rollers 22a and 22b, which become a reverse portion rotating the traveling direction of the recording material 16 on which the toner image is fixed by the fixing device 12 (a fixing portion) in a first direction, and then, rotating the traveling direction of the recording material 16 in a second direction opposite to the first direction, are provided. Duplex conveying rollers 23a to 23d are provided.

<Controller>

Figure 2:
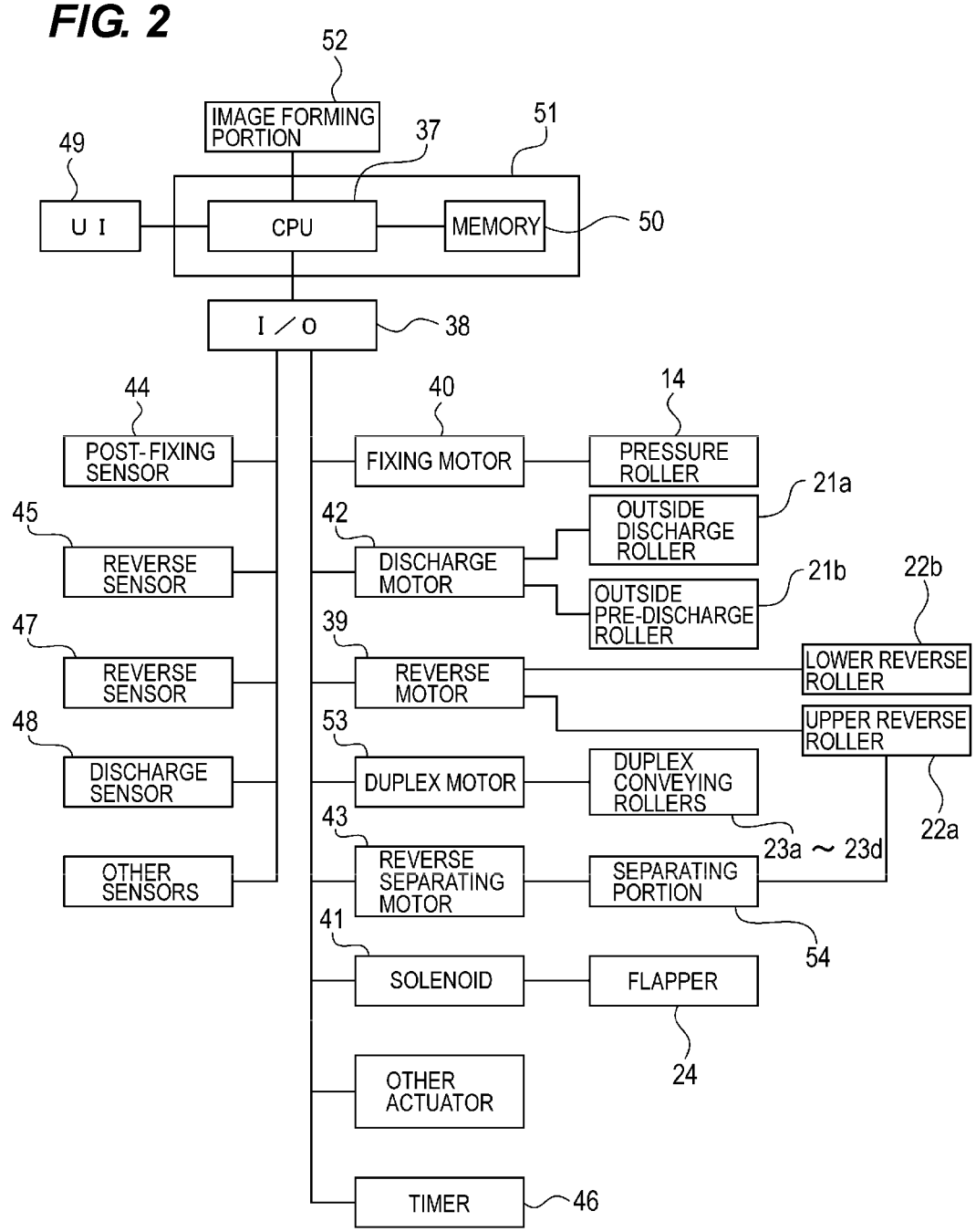
FIG. 2 is a block diagram illustrating a configuration of a control system of the image forming apparatus.

Next, a configuration of a control system of the image forming apparatus 34 will be described by using FIG. 2. FIG. 2 is a block diagram illustrating the configuration of the control system of the image forming apparatus 34. A printing job condition is set according to a user interface (UI) 49 illustrated in FIG. 2, a personal computer (PC), or the like. Then, an image forming portion 52 is controlled by a controller 51 including a central processing unit (CPU) 37, which becomes a controller, or a memory 50, according to the printing job condition.

Further, the CPU 37 drives and controls various motors through an input and output device (Input/Output; I/O) 38, based on the sensing results of various sensors. The various sensors include a post-fixing sensor 44, reverse sensors 45 and 47, a discharge sensor 48, and the like.

The various motors include a fixing motor 40, a discharge motor 42, a reverse motor 39, a duplex motor 53, a reverse separating motor 43, and the like.

The fixing motor 40 illustrated in FIG. 2 rotatively drives the pressure roller 14 which is disposed in the fixing device 12. The fixing roller 13 pressed against the pressure roller 14 is rotated following the rotation of the pressure roller 14. The discharge motor 42 rotatively drives the outside discharge roller 21a and the outside pre-discharge roller 21b, which are disposed on a conveyance path 33a. The conveyance path 33a includes a curved portion 33a1 from the upper and lower reverse rollers 22a and 22b (the reverse portion) to the outside discharge roller 21a and the outside pre-discharge roller 21b (the conveying portion). Furthermore, this embodiment is an example where a gently curved portion 33a1 is disposed on the conveyance path 33a. In addition, a precipitous curved portion such as a bent portion may be disposed on the conveyance path 33a. In this embodiment, the curved portion 33a1 is disposed on a downstream side in a conveyance direction from a flapper 25 (refer to FIG. 4), that is, a connection point between a conveyance path 32b and the conveyance path 33a.

The reverse motor 39 rotatively drives the upper and lower reverse rollers 22a and 22b, which are disposed on a reverse conveyance path 33, in a forward inversion direction. The duplex motor 53 rotatively drives the duplex conveying rollers 23a to 23d, which are disposed on a duplex conveyance path 35. The reverse separating motor 43 drives a separating portion 54, and presses or separates a pair of rollers configuring a nip portion of the upper reverse roller 22a.

In addition, a solenoid 41 rotatively drives a flapper 24. The flapper 24 switches a conveyance path 32a and a conveyance path 32b. The conveyance path 32a directly discharges the recording material 16 passing through a fixing nip portion N2 of the fixing device 12 to the outside of the main body of the image forming apparatus 34 in a state where the toner image is in an upper direction. The conveyance path 32b reverses front and rear surfaces of the recording material 16, and reversely discharges the recording material 16 to the outside of the main body of the image forming apparatus 34 in a state where the toner image is in a lower direction. Furthermore, the layout of the motor driving each of the pair of rollers is not limited thereto, and can be suitably set.

<Image Forming Operation>

An image forming operation of the image forming apparatus 34 illustrated in FIG. 1 will be described. In each of the photoconductive drums 2, an outer circumference of an aluminum cylinder is coated with an organic photoconductive layer, a rotative driving force of the motor, which becomes a driving source (not illustrated), is imparted, and thus, the photoconductive drum 2 is rotated in a counterclockwise direction of FIG. 1. The motor described above is rotated in the counterclockwise direction of FIG. 1, according to the image forming operation of each of the photoconductive drums 2. The front surface of each of the photoconductive drums 2 rotated in the counterclockwise direction of FIG. 1 is evenly charged by each charging roller 3.

The front surface of each of the photoconductive drums 2, which is evenly charged by each of the charging rollers 3, is irradiated with laser light 1a applied from each laser scanner 1, according to image data of each of the colors of yellow Y, magenta M, cyan C, and black K, which is transmitted from the controller 51 illustrated in FIG. 2. The front surface of each of the photoconductive drums 2 is selectively exposed by the laser light 1a, and thus, an electrostatic latent image is formed.

The developer (the toner) of each of the colors, which is borne on a front surface of each developing sleeve 5 is supplied onto the electrostatic latent image formed on the front surface of each of the photoconductive drums 2, and thus, is developed as a toner image and is visualized.

On the other hand, the outer circumferential surface of the intermediate transfer belt 7 is in contact with the front surface of each of the photoconductive drums 2, and is rotatively driven in the clockwise direction of FIG. 1 by the driving roller 9 at the time of forming an image. At this time, a primary transfer voltage is applied to each primary transfer roller 8, and the toner image formed on the front surface of each of the photoconductive drums 2 is subsequently primarily transferred and superimposed on the outer circumferential surface of the intermediate transfer belt 7.

The secondary transfer roller 11 is in contact with the outer circumferential surface of the intermediate transfer belt 7 at the time of forming the image, and a secondary transfer voltage is applied to the secondary transfer roller 11. Accordingly, the toner image, which is primarily transferred onto the outer circumferential surface of the intermediate transfer belt 7, is collectively secondarily transferred onto the recording material 16 which is conveyed to a secondary transfer nip portion N1 of the outer circumferential surface of the intermediate transfer belt 7 and the secondary transfer roller 11.

The secondary transfer roller 11 abuts on the outer circumferential surface of the intermediate transfer belt 7 while the toner image primarily transferred onto the outer circumferential surface of the intermediate transfer belt 7 is secondarily transferred onto the recording material 16, but is separated from the outer circumferential surface of the intermediate transfer belt 7 in a case where the image formation is ended.

The recording material 16 onto which the toner image is secondarily transferred is conveyed to the fixing device 12 by a conveying belt 28 in a state where the toner image is on a front side. The fixing device 12 thermally fuses the transferred toner image while conveying the recording material 16, and fixes the toner image onto the recording material 16. As illustrated in FIG. 1, the fixing device 12 includes the fixing roller 13 heating the recording material 16, and the pressure roller 14 for pressing the recording material 16 against the fixing roller 13. The fixing roller 13 is formed in the shape of a hollow, and a heater (not illustrated) is embedded in the fixing roller 13. That is, the recording material 16 bearing the toner image is heated and pressurized while the recording material 16 is nipped and conveyed by the fixing roller 13 and the pressure roller 14, and the toner image is thermally fused, and is heat-fixed onto the front surface of the recording material 16.

In a case where the image forming operation is ended, the toner remaining on the front surface of the photoconductive drum 2 is cleaned by each cleaner 6. In addition, the toner remaining on the outer circumferential surface of the intermediate transfer belt 7 is cleaned by the cleaner 10. The remaining toner is collected in a collection vessel (not illustrated).

<Conveyance Operation of Recording Material>

Next, a conveyance operation of the recording material 16 in the image forming apparatus 34 will be described.

The recording material 16 which is selectively fed from each of the sheet cassettes 15a to 15d is reeled out by each sheet roller 17, and is separately fed one by one in cooperation with a separating portion (not illustrated). After that, the recording material 16 is nipped and conveyed by each conveying roller 29 and converges on a conveyance path 31. After that, the recording material 16 is conveyed towards the pre-registration roller 19 by each intermediate conveying roller 20 disposed in the conveyance path 31, and is nipped and conveyed by the pre-registration roller 19, and thus, the front end portion of the recording material 16 abuts on a nip portion of the registration roller 18 which is temporarily suspended. Then, skew feeding is corrected according to the stiffness of the recording material 16.

The registration roller 18 is rotated in synchronization with a timing where the front surface of each of the photoconductive drums 2 is exposed by being irradiated with the laser light 1a from each of the laser scanners 1. Then, the recording material 16 is nipped and conveyed by the registration roller 18, and is fed to the secondary transfer nip portion N1 of the outer circumferential surface of the intermediate transfer belt 7 and the secondary transfer roller 11.

The recording material 16 is nipped and conveyed by the outer circumferential surface of the intermediate transfer belt 7 and the secondary transfer roller 11. Accordingly, the toner image on the outer circumferential surface of the intermediate transfer belt 7 is collectively transferred onto the recording material 16. After that, the recording material 16 bearing the toner image is conveyed to the fixing device 12 by the conveying belt 28. The toner image transferred onto the recording material 16 is heat-fixed by the fixing device 12. After that, conveyance paths 32a and 32b are suitably selected according to the rotation of the flapper 24 illustrated in FIG. 4.

<Straight Discharge and Reverse Discharge>

A case is considered in which the recording material 16 passing through the fixing device 12 is straightly discharged through the conveyance path 32a. Alternatively, a case is considered in which the recording material 16 passing through the fixing device 12 is reversely discharged through the conveyance path 32b, the reverse conveyance path 33, and the conveyance path 33a. According to the setting, the conveyance paths 32a and 32b of the recording material 16 are switched by the flapper 24.

In a case where the recording material 16 passing through the fixing device 12 is straightly discharged through the conveyance path 32a, the recording material 16 passing through the fixing device 12 is delivered to the outside discharge roller 21a through the conveyance path 32a. On the other hand, in a case where the recording material 16 is discharged by reversing the front and rear surfaces of the recording material 16, the recording material 16 passing through the fixing device 12 is delivered to the upper reverse roller 22a disposed on the reverse conveyance path 33 through the conveyance path 32b.

<Straight Discharge>

Figure 4:
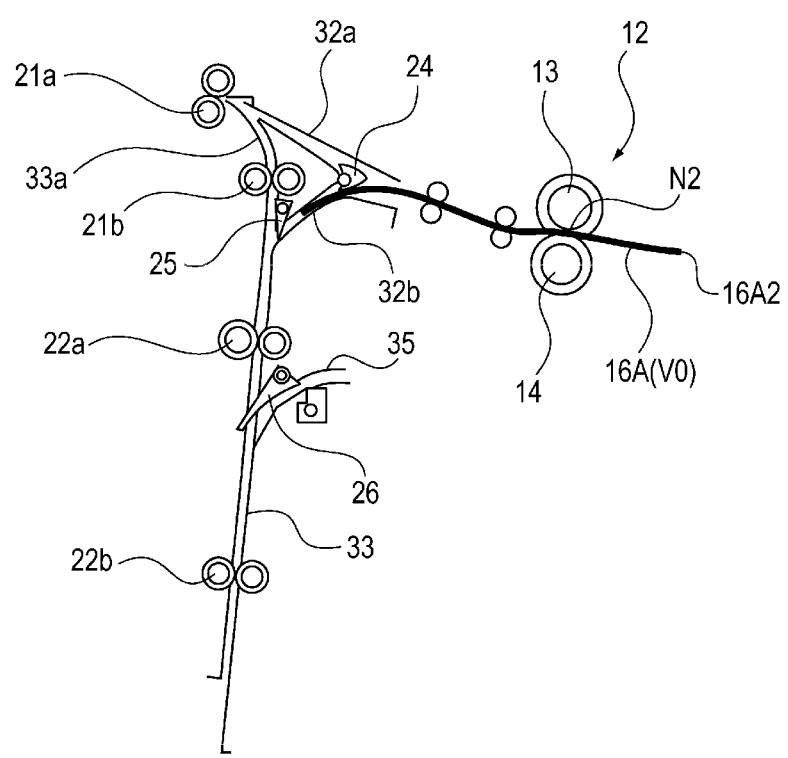
FIG. 4 is a sectional explanatory diagram illustrating the reverse discharge operation.

In a case where the conveyance path 32a is selected according to the rotation of the flapper 24 illustrated in FIG. 4, a recording material 16A passing through the fixing device 12 is nipped by the outside discharge roller 21a and is discharged to the outside of the main body of the image forming apparatus 34 through the conveyance path 32a in a state where a surface onto which the toner image is fixed is in the upper direction. Alternatively, the recording material 16A discharged to the outside of the main body of the image forming apparatus 34 by the outside discharge roller 21a is delivered to a post-process device (not illustrated), and is subjected to a predetermined post-process such as a binding process or a boring process. After that, the image forming operation is ended.

<Reverse Discharge>

On the other hand, in a case where the conveyance path 32b is selected according to the rotation of the flapper 24 illustrated in FIG. 4, the recording material 16A passing through the fixing device 12 is guided to the reverse conveyance path 33 through the conveyance path 32b. The upper reverse roller 22a is forwardly inversely rotated. The recording material 16A passing through the fixing device 12 reaches the upper reverse roller 22a disposed in the reverse conveyance path 33 through the conveyance path 32b. As a result thereof, the upper reverse roller 22a is forwardly rotatively driven in a state of nipping the recording material 16A, and the recording material 16A is conveyed through the reverse conveyance path 33 towards a lower side of FIG. 1 until an end portion 16A2, which becomes a rear end portion of the recording material 16A in the traveling direction, reaches the vicinity of the upstream of the upper reverse roller 22a.

After that, the upper reverse roller 22a is inversely rotatively driven in a state of nipping the end portion 16A2, which becomes the rear end portion of the recording material 16A in the traveling direction. Then, the flapper 25 illustrated in FIG. 4 is returned to a home position according to the pass of the recording material 16A, and thus, the conveyance path 33a is selected. As a result thereof, the recording material 16A is guided to the conveyance path 33a by reversing the conveyance direction through the reverse conveyance path 33 and is delivered to the outside discharge roller 21a and the outside pre-discharge roller 21b.

The recording material 16A which is conveyed through the conveyance path 33a from the reverse conveyance path 33 by being nipped by the upper reverse roller 22a, the outside discharge roller 21a, and outside pre-discharge roller 21b, is discharged to the outside of the main body of the image forming apparatus 34 in a state where the surface onto which the toner image is fixed is reversed to be in the lower direction. Alternatively, the recording material 16A which is discharged to the outside of the main body of the image forming apparatus 34 by the outside discharge roller 21a and the outside pre-discharge roller 21b, is delivered to the post-process device (not illustrated), and is subjected to a predetermined post-process such as a binding process or a boring process. After that, the image forming operation is ended.

<Duplex Printing>

In a case where front and rear surfaces of the recording material 16A are subjected to duplex printing, the recording material 16A in which an image is formed on a first surface passes through the fixing device 12. After that, the flapper 24 illustrated in FIG. 4 is rotated by being pressed against the recording material 16A, and thus, the conveyance path 32b is selected, and the recording material 16A passes through the conveyance path 32b and is guided to the reverse conveyance path 33. Then, the recording material 16A is delivered to the upper and lower reverse rollers 22a and 22b disposed on the reverse conveyance path 33. The upper and lower reverse rollers 22a and 22b are forwardly inversely rotated.

The end portion 16A2, which becomes the rear end portion of the recording material 16A in the traveling direction, guided to the reverse conveyance path 33, is conveyed to the vicinity of the lower reverse roller 22b at the time of performing the duplex printing. After that, the lower reverse roller 22b is inversely rotatively driven, and a flapper 26 illustrated in FIG. 4 is returned to the home position according to the pass of the recording material 16A, and thus, the recording material 16A is guided to the duplex conveyance path 35. Then, the recording material 16A is delivered to the duplex conveying rollers 23a to 23d disposed on the duplex conveyance path 35 illustrated in FIG. 1. At this time, the recording material 16A is conveyed through the duplex conveyance path 35 in a state where the first surface on which the image is formed is in the upper direction.

The recording material 16A which is conveyed by the duplex conveying rollers 23a to 23d disposed on the duplex conveyance path 35 converges again on the conveyance path 31, and is fed again to the pre-registration roller 19 and the registration roller 18. When the recording material 16A is delivered from the duplex conveying roller 23d to the pre-registration roller 19, the front and rear surfaces of the recording material 16A are reversed such that a second surface is in the upper direction.

After that, the recording material 16A is nipped by the registration roller 18, and is conveyed to the secondary transfer nip portion N1 of the outer circumferential surface of the intermediate transfer belt 7 and the secondary transfer roller 11 at a predetermined timing. In the secondary transfer nip portion N1, the toner image borne on the outer circumferential surface of the intermediate transfer belt 7 is secondarily transferred onto the recording material 16A, and then, the toner image is heat-fixed onto the recording material 16A by the fixing device 12. After that, the recording material 16A is guided to the conveyance path 32a according to the rotation of the flapper 24 illustrated in FIG. 4, is nipped and conveyed by the outside discharge roller 21a, and is discharged to the outside of the main body of the image forming apparatus 34. Alternatively, the recording material 16A is delivered to the post-process device (not illustrated), and is subjected to a predetermined post-process, and then, a duplex printing operation is ended.

The straight discharge, the reverse discharge, and the duplex printing can be arbitrarily set with respect to a printing job. According to the setting of the printing job, the CPU 37 (the controller) illustrated in FIG. 2 rotates the flapper 24 illustrated in FIG. 4 in a predetermined direction by driving and controlling the solenoid 41. Accordingly, the conveyance paths 32a and 32b are suitably switched.

On the other hand, the flappers 25 and 26 are biased in one direction by a biasing portion such as a spring (not illustrated). When the recording material 16A enters the reverse conveyance path 33 through the conveyance path 32b, the recording material 16A enters the reverse conveyance path 33 while pushing back the flapper 25 in a clockwise direction of FIG. 4 against the biasing force of the biasing portion. In a case where the recording material 16A passes through the flapper 25, the flapper 25 is returned to the home position illustrated in FIG. 4 by being biased by the biasing portion, and in such a state, the recording material 16A is capable of entering towards the conveyance path 33a from the reverse conveyance path 33.

In addition, when the recording material 16A enters the reverse conveyance path 33 through the conveyance path 32b, the recording material 16A enters the reverse conveyance path 33 while pushing back the flapper 26 in a counterclockwise direction of FIG. 4 against the biasing force of the biasing portion. In a case where the recording material 16A passes through the flapper 26, the flapper 26 is returned to the home position illustrated in FIG. 4 by being biased by the biasing portion, and in such a state, the recording material 16A is capable of entering towards the duplex conveyance path 35 from the reverse conveyance path 33.

<Reverse Discharge Operation>

Next, an example of a reverse discharge operation will be described by using FIG. 4 to FIG. 10. FIG. 4 to FIG. 10 are sectional explanatory diagrams illustrating the reverse discharge operation. In FIG. 4 to FIG. 10, the fixing roller 13, the pressure roller 14, the outside discharge roller 21a, the outside pre-discharge roller 21b, the upper reverse roller 22a, the lower reverse roller 22b, the flappers 24 to 26, and the curved conveyance path 30 including the conveyance paths 32a and 33a are illustrated.

Each of recording materials 16A, 16B, and 16C is continuously conveyed. The flapper 24 is rotated by an actuator (not illustrated). The conveyance paths 32a and 32b of the recording material 16 at the time of performing the straight discharge and at the time of performing the reverse discharge are switched according to the rotation of the flapper 24. On the other hand, the flappers 25 and 26 are biased in one direction by the biasing portion such as the spring (not illustrated). The conveyance paths of the flappers 25 and 26 are switched at the time of receiving the recording material 16 and at the time of delivering the recording material 16 after being switched-back, in the reverse discharge and the duplex printing.

FIG. 2 is a block diagram illustrating the configuration of the control system of the image forming apparatus. As illustrated in FIG. 4, the recording material 16A of the first sheet is nipped by the fixing roller 13 and the pressure roller 14 disposed in the fixing device 12, and is conveyed while the toner image is thermally fused and is heat-fixed onto the recording material 16A.

The fixing roller 13 is rotated following the pressure roller 14 rotated at a constant velocity of an image forming velocity V0 (300 mm/sec) by the fixing motor 40 which is driven and controlled by the CPU 37, which becomes the controller illustrated in FIG. 2, through the input and output device (I/O) 38. In a case of the reverse discharge operation, the recording material 16A of the first sheet is guided to the conveyance path 32b by the flapper 24 rotated by the solenoid 41 which is driven and controlled by the CPU 37 through the input and output device (I/O) 38. The recording material 16A of the first sheet is delivered to the upper reverse roller 22a through the conveyance path 32b.

Figure 5:
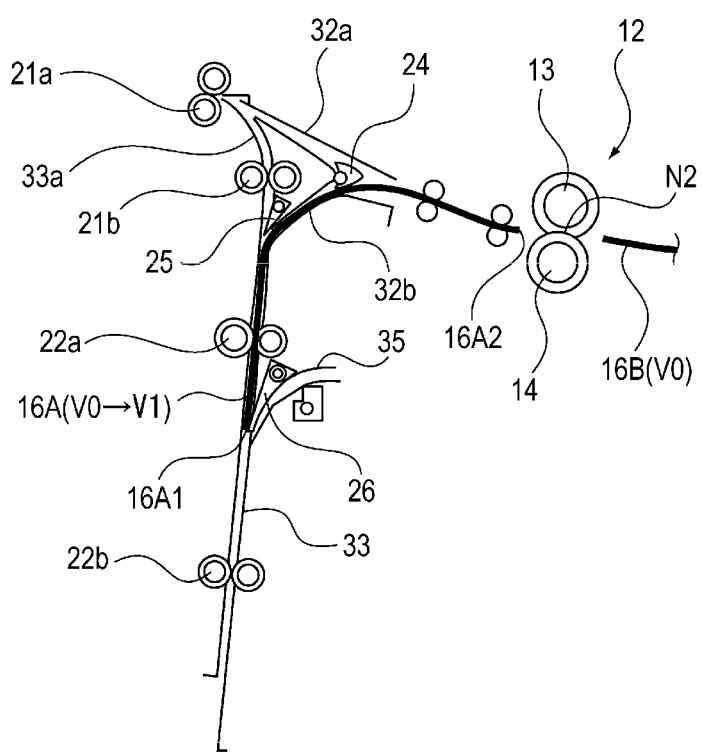
FIG. 5 is a sectional explanatory diagram illustrating the reverse discharge operation.

After that, as illustrated in FIG. 5, the end portion 16A2, which becomes the rear end portion of recording material 16A of the first sheet in the traveling direction (a lower direction of FIG. 5), passes through the fixing nip portion N2 of the fixing roller 13 and the pressure roller 14. As a result thereof, the post-fixing sensor 44 disposed on the downstream side in the vicinity of the fixing nip portion N2 senses that the end portion 16A2, which becomes the rear end portion of the recording material 16A of the first sheet in the traveling direction (the lower direction of FIG. 5), passes through the fixing nip portion N2.

The CPU 37 illustrated in FIG. 2 acceleratedly rotates the upper reverse roller 22a by the reverse motor 39, which is driven and controlled through the input and output device (I/O) 38, based on the sensing result of the post-fixing sensor 44. Accordingly, a conveyance velocity of the recording material 16A of the first sheet, which is nipped by the upper reverse roller 22a is accelerated from the image forming velocity V0 (300 mm/sec) to a first velocity V1 (600 mm/sec).

That is, the post-fixing sensor 44, which becomes a sensing portion, is disposed in the vicinity of the fixing nip portion N2 on the downstream side of the recording material 16A in the traveling direction (a left direction of FIG. 1) from the fixing nip portion N2 of the fixing roller 13 and the pressure roller 14 disposed in the fixing device 12 (the fixing portion). A predetermined timing after the end portion 16A2, which becomes the rear end portion of the recording material 16A in the traveling direction and is sensed by the post-fixing sensor 44, passes through the fixing nip portion N2 of the fixing device 12 (the fixing portion) is considered.

At such a timing, the CPU 37 (the controller) controls the first velocity V1 (600 mm/sec) of the recording material 16A according to the upper and lower reverse rollers 22a and 22b (the reverse portion) rotatively driven by the reverse motor 39, which becomes the driving source, as follow. The conveyance velocity of the recording material 16A, which is nipped and conveyed by the fixing roller 13 and the pressure roller 14 of the fixing device 12 (the fixing portion) rotatively driven by the fixing motor 40, which becomes the driving source, is the image forming velocity V0 (300 mm/sec). The conveyance velocity of the recording material 16A is accelerated to the first velocity V1 (600 mm/sec), which is faster than the image forming velocity V0, and thus, the recording material 16A is conveyed.

Then, the recording material 16A of the first sheet is nipped and conveyed by the upper reverse roller 22a rotated at the first velocity V1 (600 mm/sec), and thus, is guided into the reverse conveyance path 33. Then, as illustrated in FIG. 6, the recording material 16A of the first sheet is suspended in a reverse position where the end portion 16A2, which becomes the rear end portion of the recording material 16A of the first sheet in the traveling direction (an upper direction of FIG. 8), reaches upstream of the recording material 16A in the vicinity of the upper reverse roller 22a in the traveling direction (the upper direction of FIG. 8).

Figure 8:
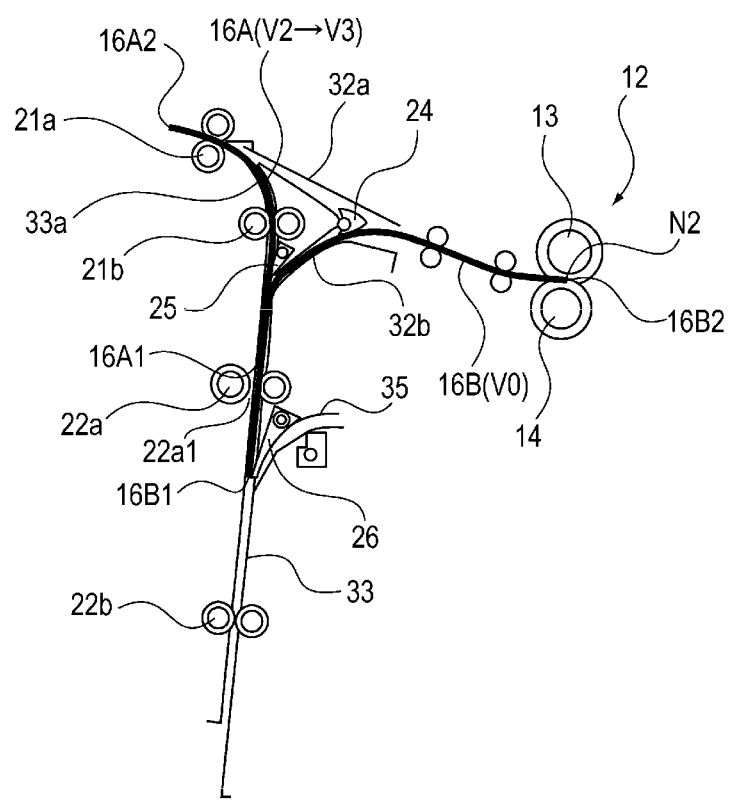
FIG. 8 is a sectional explanatory diagram illustrating the reverse discharge operation.

That is, in the CPU 37 (the controller), the reverse sensor 45 disposed upstream of the recording material 16A in the vicinity of the upper reverse roller 22a in the traveling direction (the upper direction of FIG. 8) on the reverse conveyance path 33 senses the end portion 16A2, which becomes the rear end portion of the recording material 16A in the traveling direction (the upper direction of FIG. 8). As a result thereof, it is determined that the recording material 16A reaches a predetermined reverse position illustrated in FIG. 6.

As a result thereof, the CPU 37 (the controller) forwardly rotatively drives the reverse motor 39, which becomes the driving source. Then, the recording material 16A conveyed at the first velocity V1 (600 mm/sec) by the upper and lower reverse rollers 22*a* and 22*b* (the reverse portion) which are forwardly rotatively driven by the reverse motor 39 reaches the predetermined reverse position illustrated in FIG. 6. At such a predetermined timing, the CPU 37 (the controller) temporarily suspends the reverse motor 39 which rotatively drives the upper and lower reverse rollers 22*a* and 22*b* (the reverse portion). Accordingly, the upper and lower reverse rollers 22*a* and 22*b* (the reverse portion) are temporarily suspended.

Figure 6:
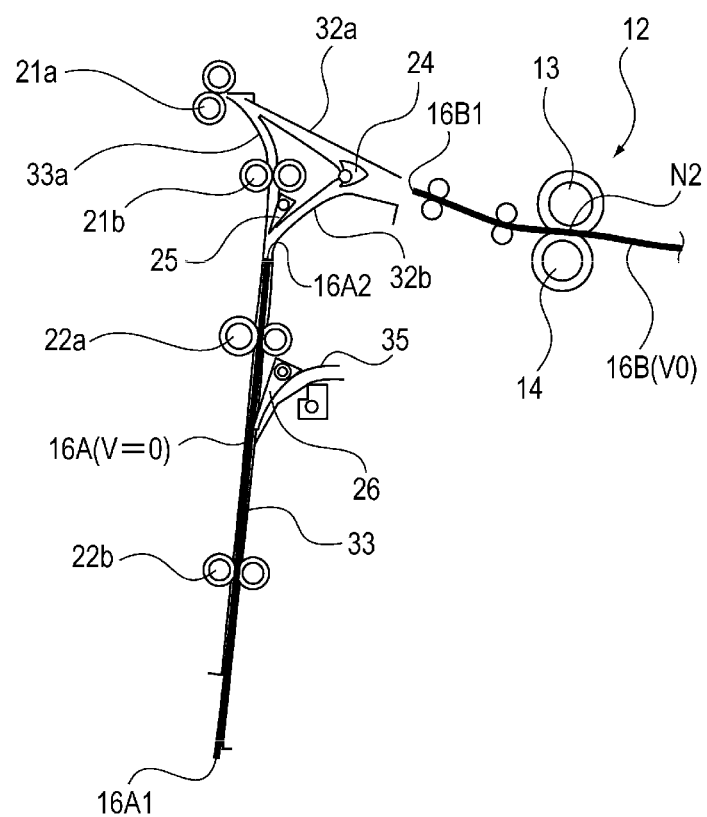
FIG. 6 is a sectional explanatory diagram illustrating the reverse discharge operation.

In this embodiment, the reverse position illustrated in FIG. 6 is a position where the position of the end portion 16A2, which becomes the rear end portion of the recording material 16A of the first sheet in the traveling direction (a lower direction of FIG. 6), reaches upstream of 30 mm from the nip portion of the upper reverse roller 22*a*. In addition, at this time, the subsequent recording material 16B of the second sheet is in a state of being nipped by the fixing roller 13 and the pressure roller 14 disposed in the fixing device 12 and of being conveyed at the image forming velocity V0 (300 mm/sec).

In this embodiment, the interval of the recording material between the end portion 16A2, which becomes the rear end portion of the recording material 16A of the first sheet in the traveling direction (the lower direction of FIG. 6), and an end portion 16B1, which becomes a front end portion of the recording material 16B of the second sheet in the traveling direction (a left direction of FIG. 6) during the image formation is 30 mm. Furthermore, in a case of the straight discharge, the recording material 16 is nipped and conveyed by the flapper 24 rotated by the solenoid 41 illustrated in FIG. 2 through the conveyance path 32*a*, and is discharged to the outside of the main body of the image forming apparatus 34 by the outside discharge roller 21*a*.

Figure 7:
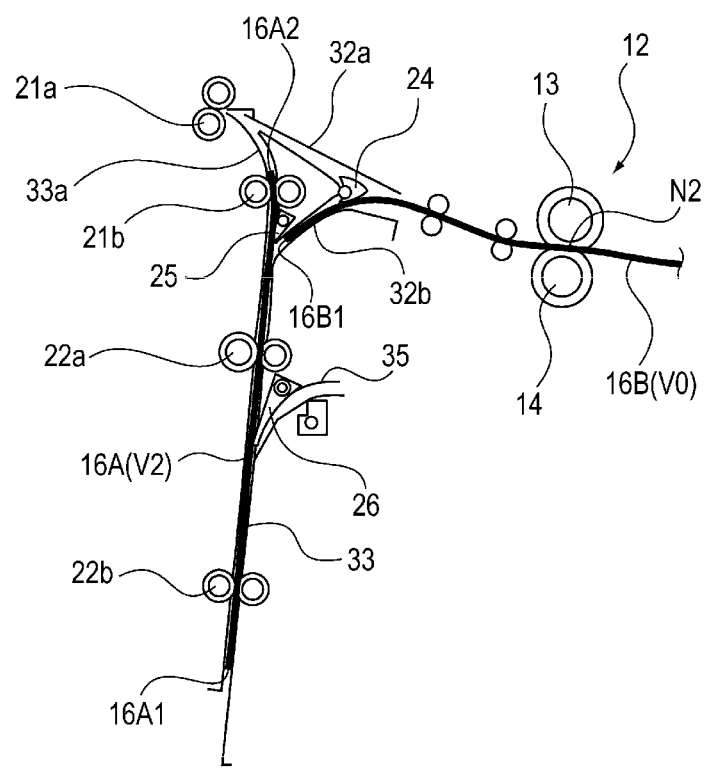
FIG. 7 is a sectional explanatory diagram illustrating the reverse discharge operation.

The recording material 16A of the first sheet reaches the reverse position illustrated in FIG. 6. After that, as illustrated in FIG. 7, the upper reverse roller 22*a* rotated by the reverse motor 39 which is driven and controlled by the CPU 37 through the input and output device (I/O) 38 as follow. The upper reverse roller 22*a* is rotated at a second velocity V2 (600 mm/sec) in a direction which is inverted from the direction where the recording material 16A of the first sheet is conveyed through the conveyance path 32*b*.

That is, the CPU 37 (the controller) inversely rotatively drives the reverse motor 39, which becomes the driving source. Then, the conveyance velocity of the recording material 16A according to the upper and lower reverse rollers 22*a* and 22*b* (the reverse portion) which are inversely rotatively driven is controlled as follow. The recording material 16A is inversely rotated at the second velocity V2 (600 mm/sec) faster than the image forming velocity V0 (300 mm/sec), which becomes the conveyance velocity of the recording material 16A to be nipped and conveyed by the fixing roller 13 and the pressure roller 14 of the fixing device 12 (the fixing portion). Then, the recording material 16A is conveyed to the outside discharge roller 21*a* and the outside pre-discharge roller 21*b* (the conveying portion) at a double velocity through the conveyance path 33*a*.

Then, the recording material 16A of the first sheet passes through the reverse conveyance path 33 in an upper direction of FIG. 7, the conveyance direction of the recording material 16A is reversed, and thus, the end portion 16A2, which becomes the front end portion, reaches the outside pre-discharge roller 21*b*. The reverse sensor 47, which becomes the sensing portion, is disposed on the downstream side of the recording material 16A in the traveling direction (an upper direction of FIG. 6) from the nip portion of the outside pre-discharge roller 21*b* in the vicinity of the outside pre-discharge roller 21*b* on the reverse conveyance path 33. Accordingly, the CPU 37 (the controller) is capable of determining that the recording material 16A is reversed and the end portion 16A2, which becomes the front end portion, reaches the outside pre-discharge roller 21*b*, according to the sensing result of the reverse sensor 47.

At this time, the subsequent recording material 16B of the second sheet is nipped by the fixing roller 13 and the pressure roller 14 disposed in the fixing device 12, and is conveyed at the image forming velocity V0 (300 mm/sec). Then, the end portion 16B1, which becomes the front end portion of the recording material 16B in the conveyance direction, is conveyed upstream of the recording material 16B in the conveyance direction (the upper direction of FIG. 7) in the vicinity of the upper reverse roller 22*a*.

Then, illustrated in FIG. 8, the end portion 16A2, which is reversed and becomes the front end portion of the recording material 16A of the first sheet, passes through the upper reverse roller 22*a*. In this position, the outside discharge roller 21*a* and the outside pre-discharge roller 21*b* are rotatively driven by the discharge motor 42 which is driven and controlled by the CPU 37 through the input and output device (I/O) 38. Then, the conveyance velocity of the recording material 16A of the first sheet according to the outside discharge roller 21*a* and the outside pre-discharge roller 21*b* is decelerated from the second velocity V2 (600 mm/sec) to a third velocity V3 (400 mm/sec).

That is, the CPU 37 (the controller) performs control as follows according to the sensing result of the reverse sensor 47, which becomes the sensing portion. The CPU 37 performs control as follows at a predetermined timing before the end portion 16A1, which is reversed and becomes the rear end portion of the recording material 16A, reaches the curved portion 33*a*1 of the conveyance path 33*a*. The discharge motor 42, which becomes the driving source, is driven and controlled, and the conveyance velocity of the recording material 16A according to the outside discharge roller 21*a* and the outside pre-discharge roller 21*b* (the conveying portion) is controlled as follows.

The recording material 16A is conveyed at the third velocity V3 (400 mm/sec) which is lower than the second velocity V2 (600 mm/sec). The third velocity V3 (400 mm/sec) is as follows. The third velocity V3 is greater than or equal to the image forming velocity V0 (300 mm/sec) which becomes the conveyance velocity at which the recording material 16A is nipped and conveyed by the fixing roller 13 and the pressure roller 14 disposed in the fixing device 12 (greater than or equal to the conveyance velocity). Further, the third velocity V3 is slower than the first and second velocities V1 and V2 (600 mm/sec).

The predetermined timing before the end portion 16A1, which is reversed on the reverse conveyance path 33 and becomes the rear end portion of the recording material 16A, reaches the curved portion 33*a*1 of the conveyance path 33*a* is the following timing. The predetermined timing is a timing before the end portion 16A1, which becomes the rear end portion of the recording material 16A in the traveling direction, passes through the nip portion of the upper reverse roller 22*a* (the reverse portion). Alternatively, the predetermined timing is in the middle where (while) the end portion 16A1 passes through the nip portion of the upper reverse roller 22*a* (the reverse portion). Alternatively, the predetermined timing is a timing after the end portion 16A1 passes through the nip portion of the upper reverse roller 22*a* (the reverse portion). The timing can be set by being suitably selected.

At this time, as illustrated in FIG. 2, deceleration control of the recording material 16A of the first sheet according to the CPU 37 is as follows. The number of rotations of the discharge motor 42, which is separately disposed from the reverse motor 39 rotatively driving the upper and lower reverse rollers 22a and 22b disposed on the reverse conveyance path 33 and becomes the driving source, is controlled. Accordingly, the deceleration control of the conveyance velocity of the recording material 16A of the first sheet which is conveyed by the outside discharge roller 21a and the outside pre-discharge roller 21b is performed.

However, in a case where a deceleration position of the recording material 16A of the first sheet is planned to be set from a front side (a lower side of FIG. 8), the deceleration control is performed as follow. The deceleration can be performed by synchronizing the number of rotations of the reverse motor 39 rotatively driving the upper and lower reverse rollers 22a and 22b with the number of rotations of the discharge motor 42 rotatively driving the outside discharge roller 21a and the outside pre-discharge roller 21b.

In addition, in this embodiment, as illustrated in FIG. 6, the recording material 16A of the first sheet is introduced to the reverse conveyance path 33, and is reversed. Then, the end portion 16A2, which becomes the front end portion, reaches a position in an immediately upper portion in the vicinity of the nip portion of the upper reverse roller 22a towards a discharge direction (the upper direction of FIG. 6). At such a time point, the conveyance velocity of the recording material 16A of the first sheet which is nipped and conveyed the upper and lower reverse rollers 22a and 22b rotatively driven by the reverse motor 39 is decelerated from inversion rotation at the second velocity V2 (600 mm/sec) to inversion rotation at the third velocity V3 (400 mm/sec).

As illustrated in FIG. 8, the recording material 16A of the first sheet pushes the flapper 26 from the reverse conveyance path 33, and is guided to the conveyance path 33a. Then, the recording material 16A of the first sheet is nipped and conveyed by the outside discharge roller 21a and the outside pre-discharge roller 21b. At this time, the end portion 16B1, which becomes the front end portion of the subsequent recording material 16B of the second sheet in the conveyance direction, is in a state of reaching the nip portion of the upper reverse roller 22a.

A pair of rollers (a pair of rotating members) configuring the nip portion is disposed on the upper reverse roller 22a (the reverse portion) to be separated from each other. As illustrated in FIG. 8, the end portion 16A2, which becomes the front end portion of the preceding recording material 16A of the first sheet in the discharge direction, passes through the conveyance path 33a, and reaches the nip portion of the outside pre-discharge roller 21b. At a point where the recording material 16A moves for a predetermined distance from the nip portion of the outside pre-discharge roller 21b, the pair of rollers configuring the nip portion of the upper reverse roller 22a is started to be separated from each other.

The upper reverse roller 22a is capable of separating the pair of rollers configuring the nip portion from each other. Accordingly, the recording material 16A of the first sheet which is delivered to the outside discharge roller 21a through the conveyance path 33a in advance is considered. Further, the recording material 16B of the second sheet which is subsequently guided to the reverse conveyance path 33 through the conveyance path 32b is considered. Each of the recording materials 16A and 16B traveling in an inversion direction is capable of sliding (being superimposed) and of being conveyed by using a gap 22a1 which is formed by separating the pair of rollers configuring the nip portion of the upper reverse roller 22a from each other.

That is, the CPU 37 (the controller) drives and controls the reverse separating motor 43, and forms the gap 22a1 in a state where the pair of rollers, which becomes the pair of rotating members configuring the nip portion of the upper reverse roller 22a (the reverse portion) illustrated in FIG. 8 is separated from each other by the separating portion 54. In this state, the preceding recording material 16A which is conveyed from the upper and lower reverse rollers 22a and 22b (the reverse portion) disposed on the reverse conveyance path 33 to the outside discharge roller 21a and the outside pre-discharge roller 21b (the conveying portion) disposed on the conveyance path 33a is considered.

Further, the subsequent recording material 16B which is conveyed from the fixing device 12 (the fixing portion) to the upper and lower reverse rollers 22a and 22b (the reverse portion) disposed on the reverse conveyance path 33 through the conveyance path 32b is considered. The recording materials 16A and 16B are conveyed in a state where the recording materials 16A and 16B slide in the traveling directions inverted from each other, with respect to the gap 22a1. Accordingly, a loss time for ensuring the interval of the recording material of the preceding recording material 16A at the time of performing the reverse discharge, and the recording material 16B which is subsequent immediately after the preceding recording material 16A is not required.

In this embodiment, the end portion 16A2, which becomes the front end portion of the recording material 16A of the first sheet in the discharge direction (the upper direction of FIG. 8) reaches a position of 30 mm on the downstream side (the upper direction of FIG. 8) from the nip portion of the outside pre-discharge roller 21b. At this time, the CPU 37 drives and controls the reverse separating motor 43, which becomes the separating portion, and starts an operation of separating the pair of rollers configuring the nip portion of the upper reverse roller 22a from each other by the separating portion 54 illustrated in FIG. 2.

Then, the end portion 16A1, which becomes the rear end portion of the recording material 16A of the first sheet in the discharge direction (the upper direction of FIG. 8), passes through the nip portion of the lower reverse roller 22b. At this timing, the CPU 37 suspends inverted rotative driving of the upper and lower reverse rollers 22a and 22b by controlling the reverse motor 39. Then, the driving is returned to forward rotation. Accordingly, the subsequent recording material 16B of the second sheet is returned to a state of being received in the reverse conveyance path 33.

As illustrated in FIG. 8, the preceding recording material 16A of the first sheet passes through the gap 22a1 formed by separating the pair of rollers configuring the nip portion of the upper reverse roller 22a from each other. During this time, the end portion 16B1, which becomes the front end portion of the subsequent recording material 16B of the second sheet in the traveling direction (a lower direction of FIG. 8) reaches the gap 22a1 which is formed by separating the pair of rollers configuring the nip portion of the upper reverse roller 22a from each other.

In the gap 22a1, the recording material 16A of the first sheet is conveyed in a state where the recording material 16A of the first sheet and the recording material 16B of the second sheet slide (are superimposed) in the traveling directions inverted from each other. High productivity is obtained on the switching-back reverse conveyance path 33. For this reason, the recording material 16A passes through the fixing device 12 at the image forming velocity V0 (300 mm/sec), and then, the conveyance velocity of the recording material 16 is accelerated to the first velocity V1 (600 mm/sec). However, as it is necessary that the recording material 16A of the first sheet and the recording material 16B of the second sheet are conveyed sliding in the traveling directions, which are inverted from each other, on the reverse conveyance path 33, the interval of the recording material of the preceding recording material 16A and the recording material 16B which is subsequent immediately after the preceding recording material 16A is in a state of being clogged.

Further, the end portion 16A1, which becomes the rear end portion of the preceding recording material 16A of the first sheet in the traveling direction (the upper direction of FIG. 8), passes through the gap 22a1 which is formed by separating the pair of rollers configuring the nip portion of the upper reverse roller 22a from each other. At this timing, the CPU 37 drives and controls again the reverse separating motor 43, and allows the pair of rollers configuring the nip portion of the upper reverse roller 22a to abut on each other by the separating portion 54 illustrated in FIG. 2. Further, the upper and lower reverse rollers 22a and 22b are forwardly rotated by controlling the reverse motor 39, and the subsequent recording material 16B of the second sheet is nipped and conveyed by the upper and lower reverse rollers 22a and 22b, and is conveyed to the reverse position illustrated in FIG. 6.

In this embodiment, the end portion 16A1, which becomes the rear end portion of the preceding recording material 16A of the first sheet in the traveling direction (the upper direction of FIG. 8) reaches the position of the gap 22a1 which is formed by separating the pair of rollers configuring the nip portion of the upper reverse roller 22a from each other. At this timing, the CPU 37 drives and controls the reverse separating motor 43, an abutting operation of the pair of rollers configuring the nip portion of the upper reverse roller 22a is started by the separating portion 54 illustrated in FIG. 2.

The end portion 16A1, which becomes the rear end portion of the preceding recording material 16A of the first sheet in the traveling direction (the upper direction of FIG. 8), reaches the position of the gap 22a1 which is formed by separating the pair of rollers configuring the nip portion of the upper reverse roller 22a from each other. At this timing, the abutting operation of the pair of rollers configuring the nip portion of the upper reverse roller 22a is started. A predetermined time is required for the abutting operation of the pair of rollers configuring the nip portion of the upper reverse roller 22a. For this reason, at a time point where the pair of rollers abuts on each other, the end portion 16A1, which becomes the rear end portion of the recording material 16A of the first sheet in the traveling direction (the upper direction of FIG. 8) is not nipped by the abutted nip portion of the upper reverse roller 22a.

Figure 9:
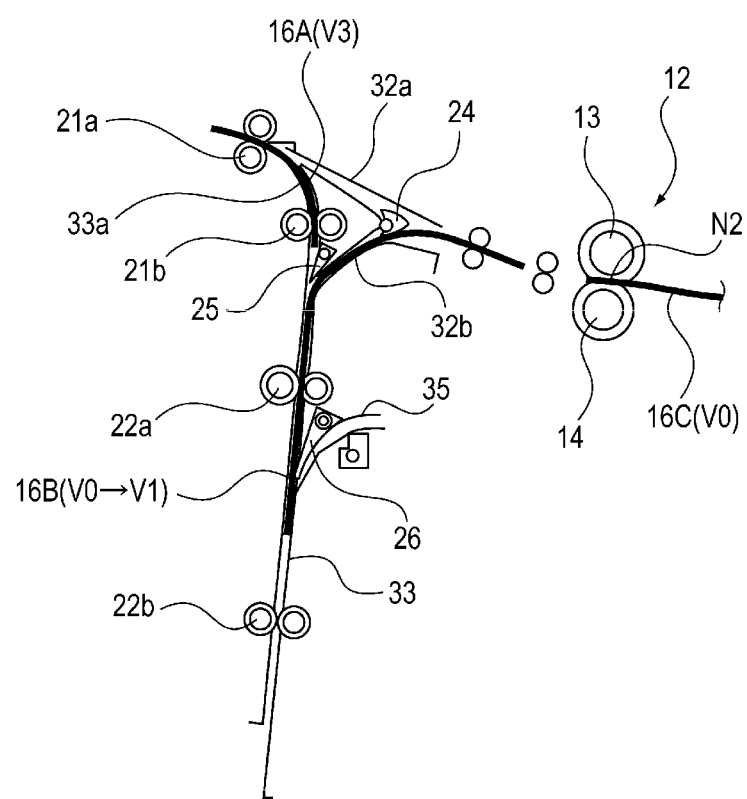
FIG. 9 is a sectional explanatory diagram illustrating the reverse discharge operation.

Then, as illustrated in FIG. 9, the subsequent recording material 16B of the second sheet passes through the fixing nip portion N2 of the fixing device 12 at the image forming velocity V0 (300 mm/sec). At this timing, the conveyance velocity is accelerated again from the image forming velocity V0 (300 mm/sec) to the first velocity V1 (600 mm/sec), and the recording material 16B is conveyed to the reverse position illustrated in FIG. 6.

As illustrated in FIG. 9, the preceding recording material 16A of the first sheet is nipped and conveyed by the outside pre-discharge roller 21b and the outside discharge roller 21a disposed on the conveyance path 33a. Then, the preceding recording material 16A passes through the curved portion 33a1 of the conveyance path 33a by inversion rotation at the third velocity V3 (400 mm/sec) which is decelerated from forward rotation at the first velocity V1 (600 mm/sec) or inversion rotation at the second velocity V2 (600 mm/sec). For this reason, the recording material 16A can be conveyed in a state of suppressing a frictional noise which occurs by a hit sound or a friction resistance due to flip-up of the recording material 16A in the curved portion 33a1 of the conveyance path 33a.

In addition, as illustrated in FIG. 9, the recording material 16C of the third sheet is nipped by the fixing roller 13 and the pressure roller 14 disposed in the fixing device 12, and is conveyed at the image forming velocity V0 (300 mm/sec), further subsequent to the subsequent recording material 16B of the second sheet. In the reverse discharge operation of a continuous printing operation, such an operation is continuously performed.

Figure 11:
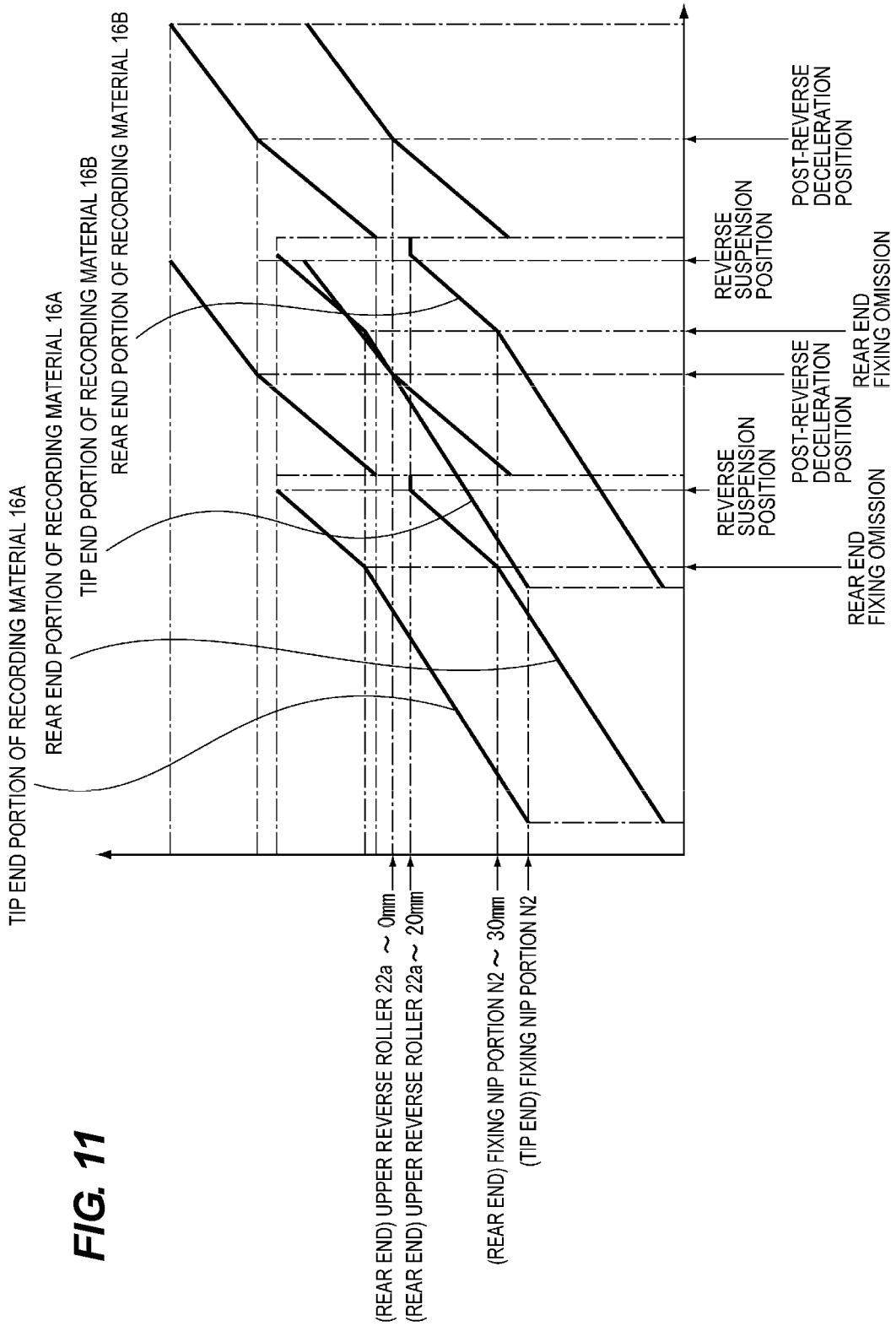
FIG. 11 is a diagram illustrating a position of an end portion of each recording material at the time of performing the reverse discharge operation.

FIG. 11 is a diagram illustrating the end portion position of each of the recording materials at the time of performing the reverse discharge operation. A horizontal axis illustrated in FIG. 11 represents timings of various conveyance control points. A vertical axis illustrated in FIG. 11 represents positions of various rollers or the like on the conveyance path and a position where the front end portion and the rear end portion of each of the recording materials 16A and 16B in the traveling direction reach. The rear end portion of each of the recording materials 16A and 16B in the traveling direction reaches downstream of 30 mm from the fixing nip portion N2 of the fixing device 12.

After that, the conveyance velocity of each of the recording materials 16A and 16B is accelerated from the image forming velocity V0 (300 mm/sec) to the first velocity V1 (600 mm/sec). Then, the recording materials 16A and 16B are reversed on the reverse conveyance path 33, and then, the rear end portion of each of the recording materials 16A and 16B in the traveling direction reaches the position of the gap 22a1 which is formed by separating the pair of rollers configuring the nip portion of the upper reverse roller 22a from each other. After that, it is represented that the conveyance velocity of each of the recording materials 16A and 16B is decelerated from the inversion rotation at the second velocity V2 (600 mm/sec) to the inversion rotation at the third velocity V3 (400 mm/sec).

Figure 3:
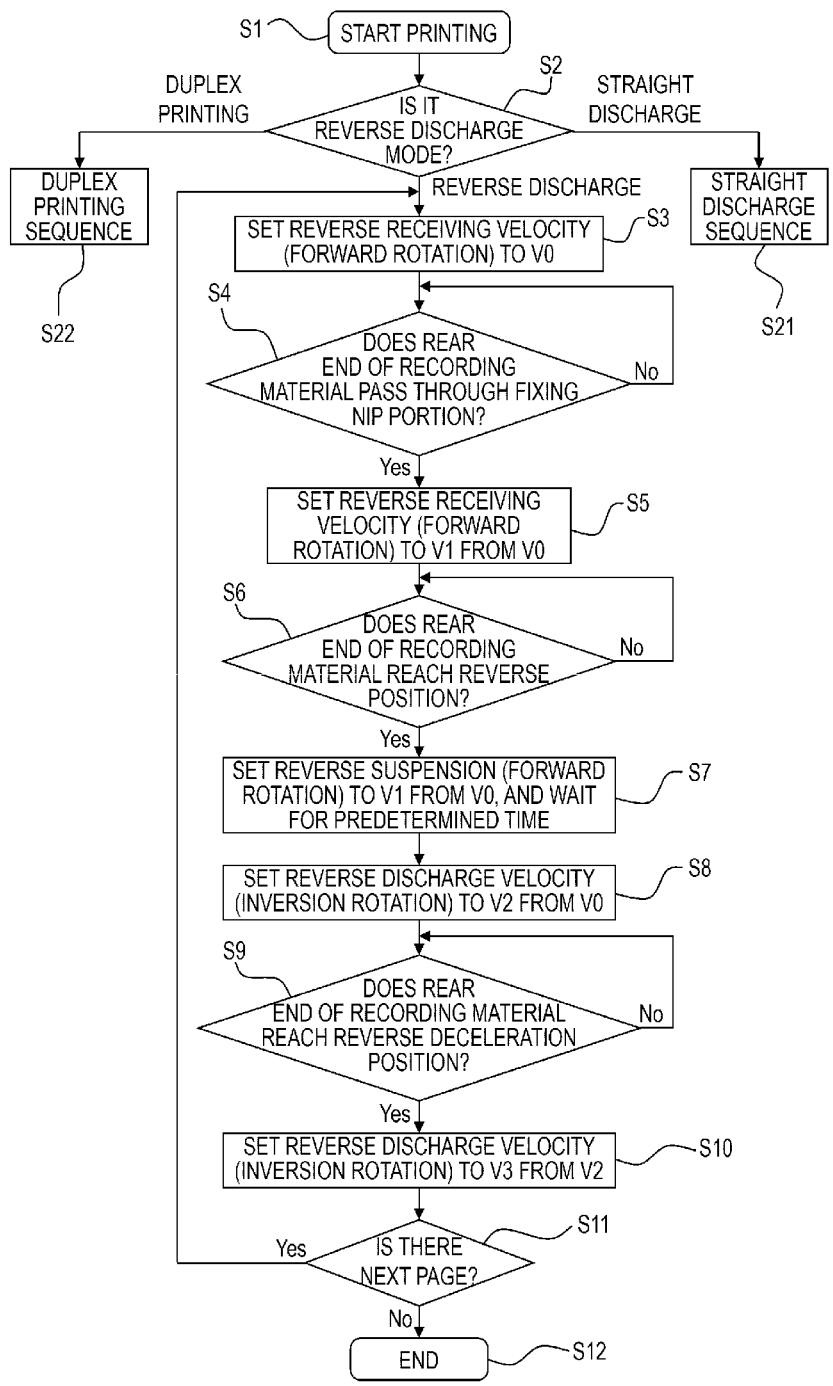
FIG. 3 is a flowchart illustrating a reverse discharge operation.

FIG. 3 is a flowchart illustrating the reverse discharge operation. In step S1 of FIG. 3, the printing job is executed, and in step S2, the CPU 37 determines whether or not a reverse discharge mode is selected on an operation panel by a user. In step S2 described above, in a case where the reverse discharge mode is selected, the process proceeds to step S3. In step S3 described above, the CPU 37 rotates the flapper 24 by driving the solenoid 41 illustrated in FIG. 2. Then, the reverse motor 39 is driven and controlled, the upper and lower reverse rollers 22a and 22b are forwardly rotated, the conveyance velocity of the recording material 16 is set to a reverse receiving velocity formed of the image forming velocity V0 (300 mm/sec), and the recording material 16 is received in the conveyance path 32b and the reverse conveyance path 33.

After that, in step S4, the CPU 37 determines whether or not the rear end portion of the recording material 16 in the traveling direction passes through the fixing nip portion N2 of the fixing device 12 based on the sensing result of the post-fixing sensor 44 illustrated in FIG. 2. In step S4 described above, in a case where the rear end portion of the recording material 16 in the traveling direction passes through the fixing nip portion N2 of the fixing device 12, the process proceeds to step S5. In step S5 described above, the CPU 37 drives and controls the reverse motor 39, a forward rotation velocity of the upper and lower reverse rollers 22a and 22b is accelerated, and the reverse receiving velocity of the recording material 16 is accelerated from the image forming velocity V0 (300 mm/sec) to the first velocity V1 (600 mm/sec).

After that, in step S6, the CPU 37 determines whether or not the recording material 16 reaches the reverse position illustrated in FIG. 6 based on the sensing result of the reverse sensor 45 illustrated in FIG. 2. In step S6 described above, in a case where the recording material 16 reaches the reverse position illustrated in FIG. 6, the process proceeds to step S7, and the CPU 37 suspends the reverse motor 39, and suspends a forward rotation of the upper and lower reverse rollers 22a and 22b.

The CPU 37 measures an elapse time from a time point where the reverse motor 39 is suspended, by a timer 46. A predetermined time t (msec) elapses from the time point where the reverse motor 39 is suspended, and then, the process proceeds to step S8. In step S8 described above, the CPU 37 inversely rotates the upper and lower reverse rollers 22a and 22b by driving and controlling the reverse motor 39, and the recording material 16 in the reverse conveyance path 33 is discharged towards the conveyance path 33a at the reverse discharge velocity formed of the inversion rotation at the second velocity V2 (600 mm/sec).

After that, in step S9, the CPU 37 determines whether or not the rear end portion of the recording material 16 in the traveling direction reaches the deceleration position based on the sensing result of the reverse sensor 47 illustrated in FIG. 2. In step S9 described above, in a case where the rear end portion of the recording material 16 in the traveling direction reaches the deceleration position, the process proceeds to step S10. In step S10 described above, the CPU 37 decelerates the rotation velocity of the outside discharge roller 21a and the outside pre-discharge roller 21b by driving and controlling the discharge motor 42, and decelerates the reverse discharge velocity from the second velocity V2 (600 mm/sec) to the third velocity V3 (400 mm/sec).

The recording material 16 which is conveyed on the conveyance path 33a at the third velocity V3 (400 mm/sec) is sensed by the discharge sensor 48 illustrated in FIG. 2, and then, is discharged to the outside of the main body of the image forming apparatus 34.

After that, in step S11, the CPU 37 determines whether or not there is the next printing page, and in a case where there is the next printing page, the process proceeds to step S3 described above, and steps S3 to S11 described above are repeated. In step S11 described above, in a case where there is no next printing page, the process proceeds to step S12, and a printing operation is ended.

In addition, in step S2 described above, a straight discharge mode is selected in which the toner image, which is heat-fixed onto the recording material 16 through the conveyance path 32a, is directly discharged to the outside of the main body of the image forming apparatus 34 in the upper direction, without selecting the reverse discharge mode. Alternatively, a duplex printing mode is selected in which the front and rear surfaces of the recording material 16 are subjected to the duplex printing through the duplex conveyance path 35. In this case, the process proceeds to each of steps S21 and S22, and a predetermined operation is performed according to a predetermined flowchart (not illustrated).

Furthermore, an example is described in which the CPU 37 determines whether or not the rear end portion of the recording material 16 in the traveling direction passes through the fixing nip portion N2 of the fixing device 12 based on the sensing result of the post-fixing sensor 44. However, another example of a determination method for determining whether or not the rear end portion of the recording material 16 in the traveling direction passes through the fixing nip portion N2 of the fixing device 12 by the CPU 37 is the following determination method.

That is, as illustrated in FIG. 1, it is considered that the front end portion of the recording material 16 in the traveling direction (a lower direction of FIG. 1) is sensed by the reverse sensor 45. Further, the length of the recording material 16 in the traveling direction is considered based on input information (the selection of the recording material 16) of the user with respect to an operation portion disposed in the image forming apparatus 34. The CPU 37 determines whether or not the rear end portion of the recording material 16 in the traveling direction (the lower direction of FIG. 1) passes through the fixing device 12 (the fixing portion) based on sensing information of the reverse sensor 45 and length information of the recording material 16.

In addition, an example is described in which the CPU 37 determines whether or not the recording material 16 reaches the reverse position based on the sensing result of the reverse sensor 45. However, another example of a determination method for determining whether or not the recording material 16 reaches the reverse position by the CPU 37 is the following determination method.

That is, the CPU 37 considers that the front end portion of the recording material 16 in the traveling direction (the lower direction of FIG. 1) is sensed by using the reverse sensor 47. Further, the CPU 37 considers the length of the recording material 16 in the traveling direction based on the input information (the selection of the recording material 16) of the user with respect to the operation portion disposed in the image forming apparatus 34. The CPU 37 determines a period (a switching timing of the recording material 16 in the conveyance direction) where the recording material 16 reaches the reverse position, based on the sensing information of the reverse sensor 47 and the length information of the recording material 16.

In addition, an example is described in which the CPU 37 determines whether or not the rear end portion of the recording material 16 in the traveling direction reaches the deceleration position based on the sensing result of the reverse sensor 47. However, another method of a determination method for determining whether or not the rear end portion of the recording material 16 in the traveling direction reaches the deceleration position by the CPU 37 is the following determination method.

That is, the CPU 37 considers that the front end portion of the recording material 16 in the traveling direction (an upper direction of FIG. 1) is sensed by the discharge sensor 48. The discharge sensor 48 is disposed upstream of the recording material 16 in the traveling direction (the upper direction of FIG. 6) from the nip portion of the outside discharge roller 21a in the vicinity of the outside discharge roller 21a (the conveying portion) on the conveyance path 33a. Further, the CPU 37 considers the length of the recording material 16 in the traveling direction based on the input information (the selection of the recording material 16) of the user with respect to the operation portion disposed on the image forming apparatus 34. The CPU 37 determines a deceleration timing before the rear end portion of the recording material 16 in the traveling direction (the upper direction of FIG. 6) reaches the curved portion 33a1 based on the sensing information of the discharge sensor 48 and the length information of the recording material 16.

In this embodiment, the conveyance velocity of the recording material 16 is decelerated before the rear end portion of the recording material 16 in the traveling direction passes through the curved portion 33a1 of the conveyance path 33a while maintaining high productivity without widening the interval of the recording material during the image formation. Accordingly, the frictional noise which occurs by the hit sound or the friction resistance due to the flip-up of the recording material 16 in the curved portion 33a1 of the conveyance path 33a is suppressed, and thus, a reduction in the noise can be obtained.

In addition, the deceleration position of the recording material 16 after being reversed on the reverse conveyance path 33 is set to a timing where the rear end portion of the recording material 16 in the traveling direction passes through the gap 22a1 which is formed by separating the pair of rollers configuring the nip portion of the upper reverse roller 22a from each other. In addition, in a case where at least the rear end portion of the recording material 16 in the traveling direction is in a state before reaching the curved portion 33a1 of the conveyance path 33a, a sufficient effect can be exhibited.

Figure 10:
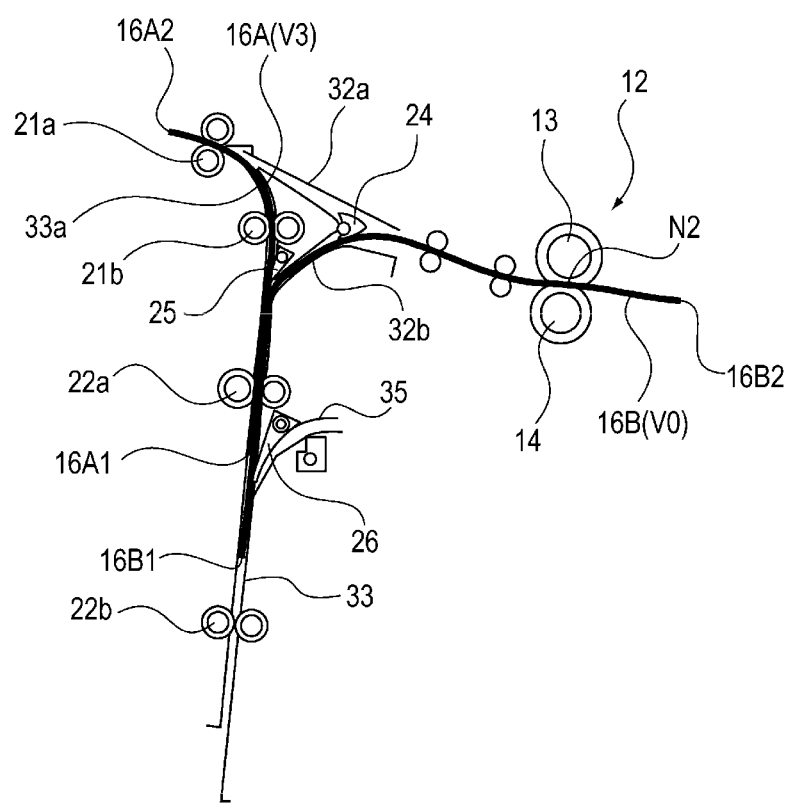
FIG. 10 is a sectional explanatory diagram illustrating the reverse discharge operation.

In addition, as illustrated in FIG. 10, there is a case where the length of the recording material 16B in the conveyance direction is longer than a conveyance distance between the fixing nip portion N2 of the fixing device 12 and the nip portion of the lower reverse roller 22b disposed on the reverse conveyance path 33. In this case, the rear end portion of the recording material 16B in the traveling direction passes through the fixing nip portion N2 of the fixing device 12. In a state where the acceleration of the conveyance velocity at this timing is started by separating the pair of rollers configuring the nip portion of the upper reverse roller 22a from each other, the recording material 16B may be nipped and conveyed by the lower reverse roller 22b.

In this case, a deceleration timing of the conveyance velocity of the recording material 16B after being switched back and reversed on the reverse conveyance path 33 may be a timing where the rear end portion of the recording material 16B in the traveling direction passes through the nip portion of the lower reverse roller 22b. In this case, the conveyance velocity of the recording material 16B is decelerated, and thus, a distance to be conveyed elongates. For this reason, it is more advantageous for a reduction in the noise where the frictional noise which occurs by the hit sound or the friction resistance due to the flip-up of the recording material 16 in the curved portion 33a1 of the conveyance path 33a is suppressed. Further, a reduction in the noise can be maximized by increasing the number of deceleration timings where the conveyance velocity of the recording material 16B after being switched back and reversed on the reverse conveyance path 33, according to the length of the recording material 16B in the conveyance direction.

That is, CPU 37 (the controller) performs control as follows according to the length of the subsequent recording material 16B of the second sheet in the conveyance direction. A timing is changed where the conveyance velocity of the preceding recording material 16A of the first sheet according to the outside discharge roller 21a and the outside pre-discharge roller 21b (the conveying portion) is decelerated to the third velocity V3 (400 mm/sec) which is slower than the second velocity V2 (600 mm/sec).

As illustrated in FIG. 8, the upper reverse roller 22a (the reverse portion) of this embodiment is disposed in a position which is closest to the fixing nip portion N2 of the fixing device 12 on the conveyance path through the conveyance path 32b. Then, the pair of rollers, which becomes the pair of rotating members configuring the nip portion, is configured as a first reverse portion which can be separated. Then, as illustrated in FIG. 10, the length of the subsequent recording material 16B of the second sheet in the conveyance direction is considered as the following length. A case is considered in which the length of the subsequent recording material 16B is longer than the conveyance distance from the fixing nip portion N2 of the fixing device 12 to the lower reverse roller 22b, which becomes a second reverse portion positioned on the downstream side (a lower direction of FIG. 10) of the recording material 16C in the traveling direction from the upper reverse roller 22a (the first reverse portion) disposed on the reverse conveyance path 33.

In this case, a predetermined timing before the end portion 16A1, which becomes the rear end portion of the preceding recording material 16A of the first sheet in the traveling direction (a lower end portion of FIG. 10), passes through the nip portion of the lower reverse roller 22b (the second reverse portion) is considered. Alternatively, a predetermined timing while the end portion 16A1 passes through the nip portion of the lower reverse roller 22b (the second reverse portion) is considered. Alternatively, a predetermined timing after the end portion 16A1 passes through the nip portion of the lower reverse roller 22b (the second reverse portion) is considered. At this timing, the conveyance velocity of the preceding recording material 16A of the first sheet according to the outside discharge roller 21a and the outside pre-discharge roller 21b (the conveying portion) is controlled as follows. The recording material 16A of the first sheet is conveyed at the third velocity V3 (400 mm/sec) which is slower than the second velocity V2 (600 mm/sec).

Furthermore, in this embodiment, the gently curved portion 33a1 is disposed on the conveyance path 33a on which the outside pre-discharge roller 21b and the outside discharge roller 21a are disposed. In addition, the vicinity of the upper reverse roller 22a disposed on the reverse conveyance path 33 is not necessarily limited to a straight line, and includes a case being slightly curved. In particular, a greatly curved (bent) portion, which easily affects the frictional noise of the recording material 16, is defined as a curved (bent) conveyance path.

The recording material 16, which passes through the fixing nip portion N2 of the fixing device 12 and is guided to the reverse conveyance path 33 through the conveyance path 32b, is reversed by the reverse conveyance path 33. After that, a timing before the rear end portion of the recording material 16 in the traveling direction reaches the curved portion 33a1 of the conveyance path 33a disposed between the upper reverse roller 22a and the outside discharge roller 21a is considered.

At this timing, the recording material 16 is conveyed by decelerating the conveyance velocity to the third velocity V3 (400 mm/sec) which is slower than the second velocity V2 (600 mm/sec) after being reversed on the reverse conveyance path 33. Accordingly, the hit sound or the frictional noise of the recording material 16 and a guide portion of the conveyance path 33a due to the flip-up of the rear end portion of the recording material 16 in the traveling direction in the curved portion 33a1 of the conveyance path 33a is suppressed, and thus, it is possible to provide an image forming apparatus having excellent silent performance while maintaining high productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-134647, filed Jul. 7, 2016, which is hereby incorporated by reference herein in its entirety.

What is claimed is:

1. An image forming apparatus comprising:
a fixing portion which fixes a toner image onto a recording material;
a reverse roller which conveys the recording material onto which the toner image is fixed by the fixing portion, wherein the reverse roller rotates in a first direction, and then, in a second direction opposite to the first direction whereby the reverse roller reverses a traveling direction of the recording material;
a conveying roller which conveys the recording material of which the traveling direction is reversed by the reverse roller;
a discharge roller which discharges the recording material conveyed by the conveying roller;
a conveyance path through which the recording material conveyed by the conveying roller is conveyed toward the discharge roller, the conveyance path including a curved portion disposed at a downstream side of the conveying roller in the traveling direction; and
a controller which controls a rotation of the reverse roller, the conveying roller, and the discharge roller such that (a) the recording material is conveyed by the reverse roller rotating in the first direction at a first velocity which is faster than a conveyance velocity of the recording material in the fixing portion after a rear end portion of the recording material in the traveling direction passes through the fixing portion, and (b) then, the recording material is conveyed toward the conveying roller by the reverse roller rotating in the second direction at a second velocity which is faster than the conveyance velocity of the recording material in the fixing portion, and (c) then, a conveyance velocity of the recording material conveyed by the conveying roller and the discharge roller is set to a third velocity which is slower than the second velocity in a status that (1) a front end portion of the recording material passes through the curved portion and is positioned at a downstream side of the discharge roller in the traveling direction of the recording material and (2) the rear end portion of the recording material is positioned at a predetermined position at an upstream side of the curved portion in the traveling direction of the recording material after the traveling direction of the recording material is changed by the reverse roller.

2. The image forming apparatus according to claim 1, further comprising a straight conveyance path configured to convey the recording material without passing the reverse roller,
wherein the straight conveyance path is connected with the conveyance path in a connecting portion disposed downstream of the curved portion, and
wherein the controller performs control such that the conveyance velocity of the recording material in the discharge roller is set to the third velocity in a status that the front end portion of the recording material is positioned at a downstream side of the connecting portion in the traveling direction of the recording material and the rear end portion of the recording material is positioned at the predetermined position at an upstream side of the curved portion in the traveling direction of the recording material after the traveling direction of the recording material is changed by the reverse roller.

3. The image forming apparatus according to claim 1, further comprising a detecting portion configured to detect the rear end portion of the recording material in the traveling direction of the recording material,
wherein the predetermined position is a position where the detecting portion is disposed, and
wherein the controller performs control such that the conveying velocity is reduced from the second velocity to the third velocity based on a detection of the rear end portion of the recording material by the detecting portion.

4. The image forming apparatus according to claim 1, wherein the controller performs control such that the third velocity is greater than or equal to the conveyance velocity of the recording material in the fixing portion and is slower than the first velocity and the second velocity.

5. The image forming apparatus according to claim 1, wherein the reverse roller is one of a pair of rotating members capable of being separated from each other.

6. The image forming apparatus according to claim 1, wherein the conveyance path includes (a) a first portion in which a preceding recording material moving from the reverse roller to the conveying roller and a subsequent recording material moving from the fixing portion to the reverse roller contact each other to be conveyed and (b) the curved portion disposed at a downstream side of the first portion in the traveling direction of the recording material after reversal by the reverse roller.

7. The image forming apparatus according to claim 6, wherein the reverse roller is one of a pair of rotating members capable of being separated from each other, and
wherein the preceding recording material which is conveyed from the reverse roller to the conveying roller and a subsequent recording material which is conveyed from the fixing portion to the reverse roller are conveyed in the first portion of the conveying path in a state in which the preceding recording material and the subsequent recording material slide in traveling directions inverted from each other, in a state in which the pair of rotating members of the reverse roller is separated from each other.

8. The image forming apparatus according to claim 1, wherein the reverse roller includes a first reverse roller which is disposed in a position closest to the fixing portion on the conveyance path and is one of a pair of rotating members configuring a nip portion is capable of being separated from each other, and
wherein in a case where a length of a subsequent recording material in a conveyance direction is longer than a conveyance distance from the fixing portion to a second reverse roller which is positioned at a downstream side of the recording material in the traveling direction from the first reverse roller, the recording material is conveyed at the third velocity which is slower than the second velocity of the conveying roller at a predetermined timing before a rear end portion of a preceding recording material in the traveling direction passes through the second reverse roller, while the rear end portion of the preceding recording material in the traveling direction passes through the second reverse roller, or after the rear end portion of the preceding recording material in the traveling direction passes by the second reverse roller.

9. The image forming apparatus according to claim 8, wherein the controller performs control such that a timing at which the conveyance velocity of the recording material by the conveying roller is decelerated to the third velocity which is slower than the second velocity is changed according to the length of the recording material in the conveyance direction.

10. The image forming apparatus according to claim 1, wherein the discharge roller is one of a pair of discharge rollers which discharges the recording material to an outside of the image forming apparatus.

11. An image forming apparatus comprising:
a fixing portion which fixes a toner image onto a recording material;
a reverse roller which conveys the recording material onto which the toner image is fixed by the fixing portion, wherein the reverse roller rotates in a first direction, and then, in a second direction opposite to the first direction whereby the reverse roller reverses a traveling direction of the recording material;
a conveying roller which conveys the recording material of which the traveling direction is reversed by the reverse roller;
a discharge roller which discharges the recording material conveyed by the conveying roller;
a conveyance path through which the recording material conveyed by the conveying roller is conveyed toward the discharge roller, the conveyance path including a curved portion disposed at a downstream side of the conveying roller in the travelling traveling direction; and
a controller which controls a rotation of the reverse roller, the conveying roller, and the discharge roller such that (a) the reverse roller conveys the recording material at a predetermined velocity, and (b) then, a conveyance velocity of the recording material conveyed by the conveying roller and discharge roller is reduced to another velocity which is slower than the predetermined velocity, in a status that (1) a front end portion of the recording material passes through the curved portion and is positioned at a downstream side of the discharge roller in the traveling direction of the recording material and (2) the rear end portion of the recording material is positioned at a predetermined position at an upstream side of the curved portion after the traveling direction of the recording material is changed by the reverse roller.

12. The image forming apparatus according to claim 11, further comprising a straight conveyance path configured to convey the recording material without passing the reverse roller,
wherein the straight conveyance path is connected with the conveyance path in a connecting portion disposed downstream of the curved portion, and
wherein the controller performs control such that the conveyance velocity of the recording material in the discharge roller is set to the another velocity in a status that the front end portion of the recording material is positioned at a downstream side of the connecting portion in the traveling direction of the recording material and the rear end portion of the recording material is positioned at the predetermined position of an upstream side of the curved portion in the traveling direction of the recording material after the traveling direction of the recording material is changed by the reverse roller.

13. The image forming apparatus according to claim 11, further comprising a detecting portion configured to detect the rear end portion of the recording material in the traveling direction of the recording material,
wherein the predetermined position is a position where the detecting portion is disposed, and
wherein the controller performs control that the conveying velocity is reduced from the predetermined velocity to the another velocity based on a detection of the rear end portion of the recording material by the detecting portion.

* * * * *